(No Model.)
E. DUPLESSIS.
CAR MOVER.
No. 363,124. Patented May 17, 1887.
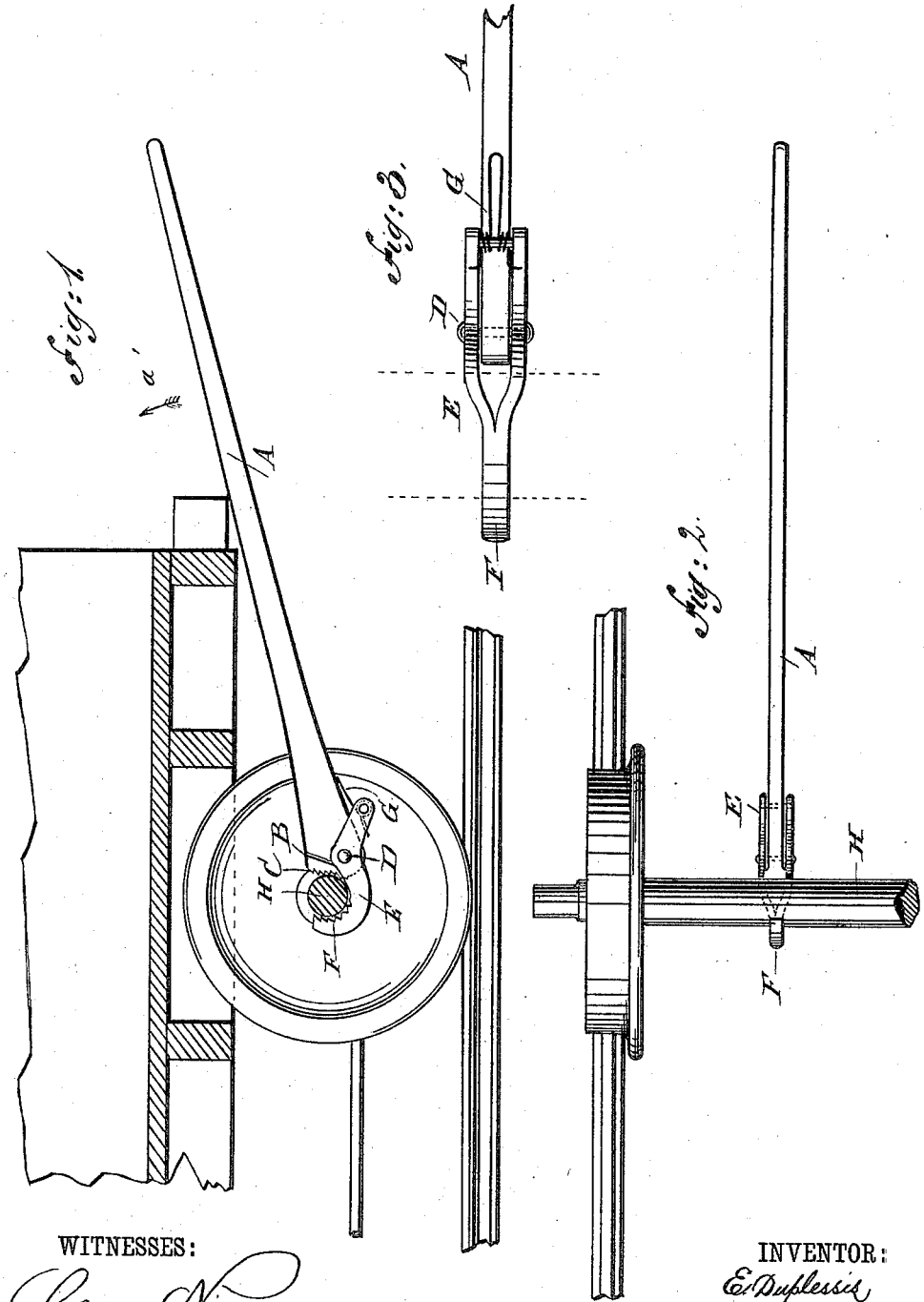
WITNESSES:
INVENTOR: E. Duplessis
BY Munn & Co.
ATTORNEYS.

UNITED STATES PATENT OFFICE.

ELOUILD DUPLESSIS, OF LAKE WEEDON, QUEBEC, CANADA.

CAR-MOVER.

SPECIFICATION forming part of Letters Patent No. 363,124, dated May 17, 1887.

Application filed January 14, 1887. Serial No. 224,351. (No model.)

*To all whom it may concern:*

Be it known that I, ELOUILD DUPLESSIS, of Lake Weedon, in the county of Wolfe, in the Province of Quebec and the Dominion of Canada, have invented a new and Improved Car-Mover, of which the following is a full, clear, and exact description.

The object of my invention is to provide a new and improved device for moving cars and for other purposes.

The invention consists in the construction and arrangement of parts and details and combinations of the same, as will be fully described hereinafter, and then pointed out in the claim.

Reference is to be had to the accompanying drawings, forming a part of this specification, in which similar letters of reference indicate corresponding parts in all the figures.

Figure 1 is a sectional side elevation of part of a car to which my improvement is applied. Fig. 2 is a plan view of a car-axle with my improvement attached thereto; and Fig. 3 is an under side view of my improvement.

The lever A, of suitable length, is provided with the slightly inclined end B, on which are formed the gripping-teeth C. On the lower part of the end B is pivoted, at D the lever E, formed on one end into the hook F, and having its other end forked, the branches of which are connected by a cross-bar, to which is secured the spring G, resting with its free end against the bottom edge of the lever A.

The hook F is serrated on its inner edge, and forms with the toothed end B a pocket inclosing the car-axle or other articles to be gripped and moved. The pivot D is below the serrated edge of the hook F and the teeth C of the end B, as shown in Fig. 1.

It will be seen that when the operator desires to move the car, for instance, he raises the lever up to the car-axle and presses against it, so that the hook F opens and permits of introducing the axle H into the pocket formed between the said hook and the edge B, as shown in Fig. 1. When the operator now exerts a pressure on the lever A in the direction of the arrow *a'*, he causes a rotation of the axle H and a consequent movement of the car, as the hook F and the toothed inclined edge B grip the axle H firmly. When the operator moves the lever A downward in the inverse direction of the arrow *a'*, the serrated edge of the hook F and the toothed end B do not grip the axle, thus permitting a free downward motion of the lever A. The hook F and the serrated edge B of the lever A, however, hold sufficiently on the axle H to prevent the lever from dropping off of the axle. To make the lever A drop off, the operator has to twist the lever sidewise, whereby the hook F opens. Hooking the lever A on the upper side of the axle and working it up and down will impart a reverse motion to the car.

The inner edge of the hook F may be without teeth, if desired.

Having thus fully described my invention, I claim as new and desire to secure by Letters Patent—

The combination of the lever A, provided with the teeth C, the lever E, pivoted to the end of the lever A and formed with the hook F at one end and having its other end forked and connected by a cross-bar, and a spring secured to the cross-bar and resting with its free end against the lever A, as specified.

ELOUILD DUPLESSIS.

Witnesses:
MICHEL LEBLANC,
O. TROTTIER.